Dec. 5, 1961  A. R. CRAWFORD ET AL  3,012,246
ANTENNA UNIT

Filed Aug. 30, 1957  2 Sheets-Sheet 1

INVENTORS
Arthur R. Crawford
Glen H. Thomas
BY Diggins & LeBlanc
ATTORNEYS

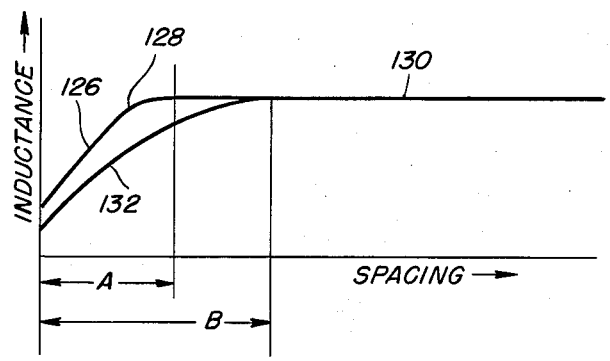
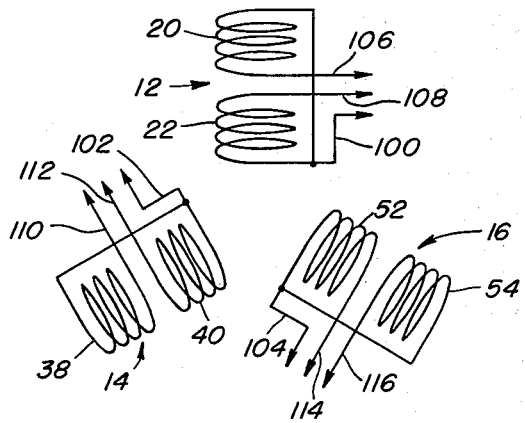

ns patent office 3,012,246
Patented Dec. 5, 1961

3,012,246
ANTENNA UNIT
Arthur R. Crawford and Glen H. Thomas, Columbus, Ohio, assignors to International Research & Development Corp., Columbus, Ohio, a corporation of Ohio
Filed Aug. 30, 1957, Ser. No. 681,361
13 Claims. (Cl. 343—788)

This invention relates to radio guidance systems for mobile craft and more particularly relates to an improved antenna unit for use in an automatic direction finding system for aircraft.

In assignee's copending application Serial No. 685,486 filed September 23, 1957, there is disclosed a radio guidance system for aircraft, commonly referred to as an automatic direction finding system. According to that system three loop antennas have their axes disposed at equal angles of 120° from one another and are connected to the indication producing device. The loops are preferably of identical electrical characteristics, i.e., inductance, capacitance, resistance and Q, so that they produce identical signals under similar conditions with respect to the radiation source.

Since the direction finding system disclosed in the aforementioned copending application is designed for use upon all types of aircraft, and in particular on lightweight private aircraft, it is desirable that the antenna system present a minimum weight and bulk and that it be susceptible of mounting upon different types of aircraft without modification of the aircraft itself.

It is accordingly a primary object of the present invention to provide such an antenna unit which may be produced in an economical manner and which is lightweight, small and rugged, and which may be mounted on existing aircraft without modification of the aircraft.

It is another object of the invention to provide a three loop antenna unit which is rugged, small, and not subject to changes in electrical characteristics with variation in temperature, humidity, or the normal wear and tear to which it is subjected in use upon an aircraft.

These and further objects and advantages of the invention will become more apparent upon reference to the following specification and claims and the appended drawings wherein:

FIGURE 3 is a graph showing the effect of variation of the spacings of the various loops of the antennas upon the inductance of the coils; and FIGURE 4 is a diagrammatic view showing the electrical connections of the antennas.

Figure 1:
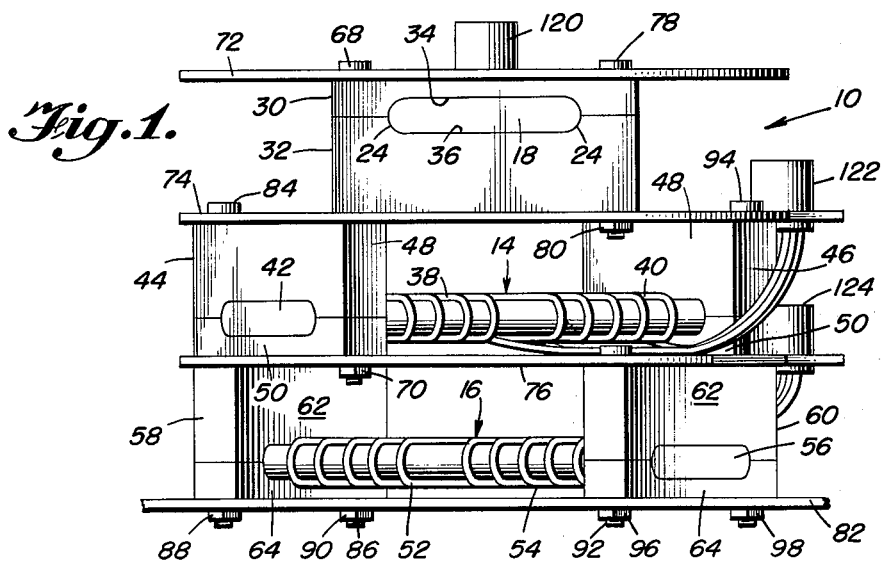
FIGURE 1 is a side elevation of an antenna unit constructed according to the present invention.
Figure 2:
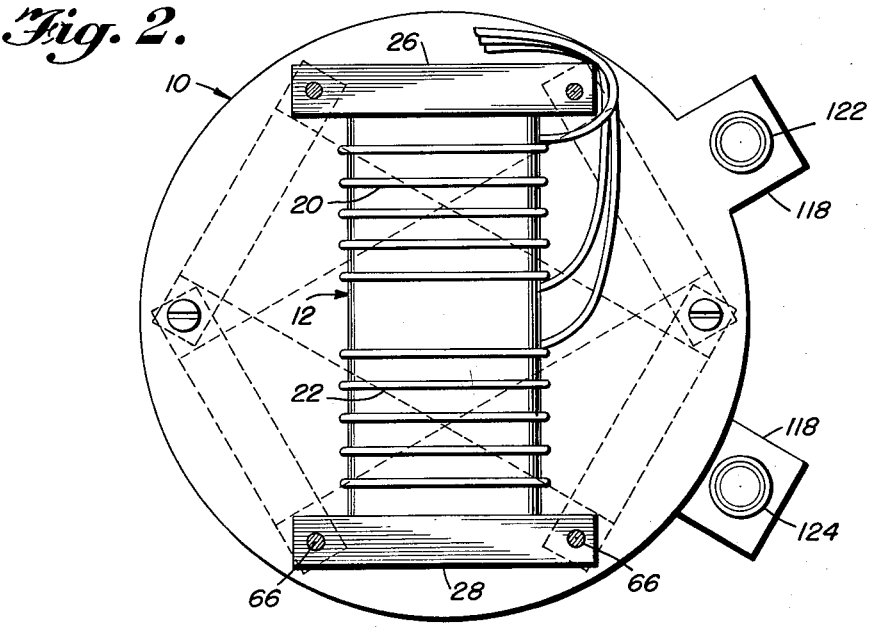
FIGURE 2 is a plan view of the antenna unit of FIGURE 1, with the top mounting plate removed.

Referring more particularly to FIGURES 1 and 2 of the drawing there is shown an antenna unit, generally indicated at 10, which consists of three individual loop antennas 12, 14 and 16. Each of these loop antennas consists of a flat elongated core 18 carrying a pair of evenly distributed single layer windings 20 and 22 at opposite ends thereof. The cores are magnetic and preferably are of the powdered type, comprising such materials as powdered iron, permalloy or molybdenum permalloy held in an insulating binder. The cores preferably have rounded edges 24 and are insulated, such as by the application of a rubber sheath or other insulating layer therearound.

The ends of the cores are mounted in mounting blocks formed of an insulating material, such as Bakelite or some similar material. The uppermost loop 12 has the ends of its core fastened between a pair of mounting blocks 26 and 28, each of which comprises an upper block 30 and a lower block 32, as best seen in FIGURE 1. The lower block 32 is of a greater height than the upper block 30 and both blocks are provided with oppositely disposed cutaway portions 34 and 36 to receive the ends of the core.

The second or intermediate loop 14, as seen in FIGURE 1, also has a pair of coils 38 and 40 wound about the ends of a core 42 which is mounted between mounting blocks 44 and 46. These mounting blocks consist of upper blocks 48 and lower blocks 50, the upper blocks being of a greater height than the lower blocks, and all blocks being provided with cutaway portions to receive the core ends.

The lowermost loop 16 similarly is provided with coils 52 and 54 on the ends of a core 56 mounted in mounting blocks 58 and 60. These mounting blocks consist of upper blocks 62 and lower blocks 64 having cutaway portions to receive the core ends. The upper blocks 62 are of a greater height than the lower blocks 64.

The ends of all mounting blocks are provided with vertical bores 66 near the ends thereof for receiving mounting screws as is best seen in FIGURE 2. Referring to FIGURE 1, an elongated screw 68 passes through the leftmost bore in mounting block 28 and through the right end of the block 44, which is immediately therebelow. A nut 70 fastens these blocks together and secures the blocks to circular mounting plates 72, 74 and 76 which are formed of a suitable insulating material. The mounting plate 72 is located above the uppermost mounting block 28, mounting plate 74 is below mounting block 28 and above mounting block 44, and mounting plate 76 is below mounting block 44 and above mounting block 58. A shorter screw 78 passes through the bore 66 in the rightmost side of mounting block 28, as seen in the drawings, and is fastened to the mounting plate 72 and 74 by a nut 80. Mounting block 26 at the other end of loop 12 is similarly secured to the mounting plates by means of one screw, not shown, which passes through mounting plates 72, 74 and 76, and one screw which passes through mounting plates 72 and 74.

Mounting blocks 44 and 58 are secured to mounting plates 74 and 76 and to a mounting member 82 by means of screws 84 and 86 and nuts 88 and 90. Mounting blocks 46 and 60 are similarly fastened to mounting plates 74, 76 and 82 by screws 92 and 94, and nuts 96 and 98. All screws and nuts are preferably formed of insulating material to avoid introducing extraneous metal into the vicinity of the loops which might affect their electrical characteristics.

The outside ends of the coils 20—22, 38—40 and 52—54 are connected together and terminate in leads 100, 102 104. These form the center tap of the loops and are grounded to provide a balanced input to the receiver. The inner ends of the individual coils terminate in the even numbered leads 106—116. Each of the mounting plates 72, 74 and 76 is provided with a tab like extension 118 mounted in line with the axis of the core associated therewith and these tabs carry connectors 120, 122 and 124. Leads 100, 106 and 108 of loop 12 are connected to connector 120; leads 102, 110 and 112 of loop 14 are connected to connector 122; and leads 104, 114 and 116 of loop 16 are connected to connector 124.

It has been found experimentally that the minimum vertical spacing between the three loops is somewhat critical and that the spacing "A" between the lowermost loops 14 and 16 should be different than the spacing "B" between the uppermost loops 12 and 14, in order to obtain substantially identical electrical characteristics in each of the three loops.

Referring to FIGURE 3, experimentation has shown that if the inductance of loop 14 is plotted against its vertical spacing from loop 16, a curve such as curve 126 is obtained. It will be seen that this curve possesses a definite knee 128 and that beyond this knee the inductance is substantially constant as shown at 130. Experimentation has also shown that when the uppermost loop 12 is then mounted above the lower loops 14 and 16 the inductance of loop 14 varies in the manner as shown in curve 132 because of the combined effects of loops 12 and 16 on the center loop 14.

It has been found that in order to obtain similar electrical characteristics with identical loops and in order to prevent vibration, temperature or humidity changes from affecting the electrical characteristics of the different loops in diverse manners, it is desirable to space the individual loops so that the inductance obtained is on the flat portions of the curves 126 and 132, above the respective knees in the curves. When this is done the inductance of the individual loops is unaffected by the presence of the other cores.

In a specific example of an antenna unit constructed according to this invention ferrite cores three-eighths inch thick, two inches wide and five inches long were used. The minimum distance "A" between the centers of loops 14 and 16 was one and seven-sixteenths inches, while the minimum distance between the centers of loops 12 and 14 was two and one-sixteenth inches, providing a ratio of B to A of about 1.4. It will be noted that when the unit is constructed in this manner its height is no more than the length of the individual cores so that the entire unit may be housed in a quite small plastic dome. The convenience and advantage of such a mounting will be appreciated when it is pointed out that if the loops are physically mounted in a Y configuration, such as is shown in the circuit diagram of FIGURE 4, the total diameter would have to be at least 16–18 inches.

It will be apparent from the foregoing that according to the present invention there is provided a compact three loop antenna unit which is rugged in construction, relatively low in cost, and susceptible of being attached to varying types of aircraft without constructional modification of the aircraft. Since it is possible to obtain identical electrical characteristics with identical loops, it is possible to mass produce all of the loops in the same manner thereby effecting a savings in manufacturing costs.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed and desired to be secured by the United States Letters Patent is:

1. A direction finding antenna unit comprising in combination, a first coil means wound on a first elongated core about the longitudinal axis thereof, a second coil means wound on a second elongated core about the longitudinal axis thereof, said second core being mounted above said first elongated core and having its axis disposed at an angle of 120° with respect to the axis of said first elongated core, and a third coil means wound on a third elongated core about the longitudinal axis thereof, said third core being mounted above said first two cores and having its longitudinal axis disposed at an angle of 120° with respect to the longitudinal axes of said first two cores, each of said coils forming a separate antenna loop and producing a signal output whose amplitude is a function of the position of a transmitter with respect to the axis of said elongated cores.

2. A direction finding antenna unit comprising in combination, a first coil means wound on a first elongated core of magnetic material about the longitudinal axis thereof, a second coil means wound on a second elongated core of magnetic material about the longitudinal axis thereof, said second core being mounted above said first elongated core and having its axis disposed at an angle of 120° with respect to the axis of said first elongated core, said second core and coil means being mounted above said first core by such a distance that the inductance of said second coil means is substantially unaffected by the presence of said first core, and a third coil means wound on a third elongated magnetic core about the longitudinal axis thereof, said third core being mounted above said first two cores and having its longitudinal axis disposed at an angle of 120° with respect to the longitudinal axes of said first two cores, said third core and coil means being mounted above said second core by such a distance that the inductance of said second coil means is substantially unaffected by the presence of said first and second cores, each of said coils forming a separate antenna loop and producing a signal output whose amplitude is a function of the position of a transmitter with respect to the axis of said elongated cores.

3. A direction finding antenna unit as set out in claim 2 wherein said coil means are substantially identical and said third core is spaced from said second core by a distance greater than said second core is spaced from said first core.

4. A direction finding antenna unit as set out in claim 3 wherein each coil means comprises a first single layer coil on one end of the core and a second single layer coil on the other end of the core, the outer ends of said two coils being connected together and the inner ends serving as terminals.

5. A direction finding antenna unit as set out in claim 4 wherein the ratio of the distance between the third and second cores and the distance between the second and first cores is on the order of 1.4.

6. A direction finding antenna unit comprisnig in combination, an intermediate elongated magnetic core having its ends received in insulating mounting blocks, an upper insulating plate secured to the top of said mounting blocks, a lower insulating plate secured to the bottom of said mounting blocks, an upper elongated magnetic core having its end received in insulating mounting blocks secured to the top of the upper insulating plate, the longitudinal axis of said upper core being disposed at an angle of 120° with respect to the longitudinal axis of said intermediate core, a lower elongated magnetic core having its ends received in insulating mounting blocks secured to the bottom of said lower insulating plate, said lower core having its longitudinal axis disposed at an angle of 120° with respect to said upper and intermediate cores, and coil means wound about each of said cores, each of said coil means forming a separate antenna loop and producing a signal output whose amplitude is a function of the position of a transmitter with respect to the axis of said elongated cores.

7. A direction finding antenna unit as set out in claim 6 wherein each of said mounting blocks comprises an upper block above the associated core, and a lower block below the associated core, said upper and lower blocks having oppositely disposed cut away portions for receiving the ends of said cores.

8. A direction finding antenna unit as set out in claim 7 wherein said mounting blocks extend beyond the sides of said cores and are provided with bores receiving insulating screws fastening the blocks to the insulating plates.

9. A direction finding antenna unit as set out in claim 8 wherein half of said insulating screws pass through two mounting blocks and half pass through one mounting block.

10. A direction finding antenna unit as set out in claim 9 including a top insulating plate secured to the top of the mounting blocks receiving said upper core.

11. A direction finding antenna unit as set out in claim 10 including a mounting member secured by said screws to the bottom of the mounting blocks receiving said lower core.

12. A direction finding antenna unit as set out in claim 11 wherein said coil means are substantially identical and said intermediate core is spaced above said lower core by such a distance that the inductance of said coil means on said intermediate core is unaffected by the presence of said lower core, and said upper core is spaced above said intermediate core by a distance such that the inductance of said coil means on said upper core is unaffected by the intermediate and lower cores.

13. A direction finding antenna unit as set out in claim 12 wherein the vertical distance between said upper and intermediate cores is greater than the vertical distance between said intermediate and lower cores.

References Cited in the file of this patent
UNITED STATES PATENTS

| | | |
|---|---|---|
| 2,262,419 | Athy | Nov. 11, 1941 |
| 2,740,113 | Hemphill | Mar. 27, 1956 |